United States Patent [19]

Atkins

[11] Patent Number: 5,269,913
[45] Date of Patent: Dec. 14, 1993

[54] DEBRIS TRAP

[75] Inventor: David S. Atkins, Transvaal, South Africa

[73] Assignee: Zarina Holding C.V., Amsterdam, Netherlands

[21] Appl. No.: 770,118

[22] Filed: Oct. 2, 1991

[51] Int. Cl.$^5$ .......................................... B01D 35/147
[52] U.S. Cl. ...................................... 210/136; 210/169; 210/416.2; 210/436; 210/444; 210/445; 210/472; 4/490; 15/1.7
[58] Field of Search ............ 210/117, 136, 120, 416.2, 210/436, 443, 444, 445, 450, 459, 472, 169; 4/490; 15/1.7

[56] References Cited

U.S. PATENT DOCUMENTS

| | | | |
|---|---|---|---|
| 904,678 | 11/1908 | Brunner | 210/440 |
| 1,019,161 | 3/1912 | Ivor | 210/440 |
| 1,303,438 | 5/1919 | Wiehl et al. | 210/440 |
| 1,508,480 | 9/1924 | Skinner | 210/443 |
| 1,616,577 | 2/1927 | Janette | 210/443 |
| 1,632,699 | 6/1927 | Denney | 210/443 |
| 1,654,615 | 1/1928 | Smith | 210/443 |
| 1,657,173 | 1/1928 | Morrison | 210/443 |
| 1,908,925 | 5/1933 | Semon et al. | 210/443 |
| 1,976,914 | 10/1934 | Benjamin | 210/440 |
| 2,467,143 | 4/1949 | Mitchell | 210/443 |
| 2,660,315 | 11/1953 | Lasky | 210/442 |
| 2,799,357 | 7/1957 | Warnecke et al. | 55/478 |
| 2,932,400 | 4/1960 | Scavuzzo | 210/436 |
| 2,937,754 | 5/1960 | Kasten | 210/440 |
| 3,012,676 | 12/1961 | Englesberg | 210/443 |
| 3,138,552 | 6/1964 | Richards | 210/318 |
| 3,298,528 | 1/1967 | Franck | 210/444 |
| 3,640,390 | 2/1972 | Goy et al. | 210/136 |
| 3,695,437 | 10/1972 | Shaltis | 210/136 |
| 3,777,889 | 12/1973 | Henderson | 210/136 |
| 3,935,106 | 1/1976 | Lipner | 210/436 |
| 4,082,673 | 4/1978 | Cilento | 210/436 |
| 4,132,641 | 1/1979 | Elsworth | 210/440 |
| 4,257,890 | 3/1981 | Hurner | 210/440 |
| 4,998,437 | 1/1991 | Gefter et al. | 210/445 |

Primary Examiner—Stanley S. Silverman
Assistant Examiner—Robert James Popovics
Attorney, Agent, or Firm—Kilpatrick & Cody

[57] ABSTRACT

A debris trap and in-pool skimmer for use in combination with a swimming pool cleaner having a housing; a housing lid having a conduit with an inlet and an outlet; a filter suspended within the housing; a downspout normal to and intersecting the conduit that penetrates the lid and the filter, is in fluid communication with the inlet and prevents direct flow between the inlet and the outlet; an exit port in the outlet that opens within the housing; and a one-way relief valve in the housing that opens within the filter.

1 Claim, 3 Drawing Sheets

DEBRIS TRAP

BACKGROUND OF THE INVENTION

The present invention relates to debris traps used in combination with automatic swimming pool cleaners. Automatic pool cleaners typically operate by connecting the cleaner to the water inlet of the swimming pool filter system skimmer. The skimmer is connected to the swimming pool filter and the filter pump. Water is drawn into the skimmer by the filter pump and then passes through a sand filter or filters. The water is then discharged back into the swimming pool.

Automatic pool cleaners typically are connected to the skimmer by a long flexible hose. This hose generally is made up of several sections connected by friction couplings. Water is drawn through the pool cleaner, the flexible hose and into the skimmer inlet by the filter pump. This water movement not only draws dirt and debris into the pool cleaner (and ultimately through the pool filter), but also serves as a motive force to move the pool cleaner about the horizontal and vertical surfaces of the pool randomly and to help hold the pool cleaner against the sides of the pool being cleaned.

Pool cleaners typically ingest a large amount of debris that has fallen into the swimming pool, some of which can be relatively large, such as leaves, twigs, pine straw and insects. If the debris is allowed to be drawn into the pool filter system, the debris can prematurely congest the pool filter or interfere with the operation of the pool cleaner regulator valve. Therefore, it is desirable to provide a device for trapping this debris before it enters the skimmer.

The use of leaf or debris traps in combination with pool cleaners is well-known. Such traps typically have a housing made in two halves, with an inlet in one half and an outlet in the other half, to allow the interior of the trap to be cleaned of accumulated debris. A filter is suspended coaxially within the housing between the inlet and the outlet. The debris trap is spliced into the pool cleaner flexible hose near the filter system skimmer so that the debris trap floats just under the surface of the water. A rubber seal is used between the halves to prevent air from entering the otherwise closed system.

This typical arrangement has several disadvantages, however. First, the debris trap generally must be disconnected from the flexible hose for cleaning. Removing the debris trap requires turning off the filter pump and increases the likelihood that air will enter the otherwise closed filter system, thereby causing the filter pump to lose its prime. In addition, a portion of the seal is always exposed to the air, which also increases the likelihood that air will enter the system because of seal failure or contamination. Further, because the filter basket is interposed directly between the inlet and the outlet and directly within the flow stream, debris tends to be forced deep into the filter grid, making it difficult to remove the debris from the filter, and plugging the filter, which reduces the flow through the filter and can render the pool cleaner inoperable. Dirt and other debris also tend to accumulate at the seal, increasing the likelihood that the debris will force the seal away from one or both halves during as the pump operates.

Other filters used in connection with industrial applications rather than swimming pool cleaners include, for example, the "T"-type strainer shown on Form No. RV 900 of RonVik, Inc. Such strainers do not permit removal of the entire filter housing, however, making cleaning of the interior of the housing difficult. These strainers also lack any relief valve or drain permitting water to enter the trap when the mechanism becomes clogged, essentially precluding their successful use with swimming pool cleaners.

SUMMARY OF THE INVENTION

The debris trap of the present invention improves prior swimming pool cleaner debris traps by providing a debris trap with a "T" configuration, with the inlet/outlet tube making up the top of the "T" and a housing containing the filter and a relief valve, drain, or similar device making up the base of the "T." The inlet/outlet tube is intersected at midpoint by a tube or downspout perpendicular to the inlet/outlet tube that prevents direct flow through the inlet/outlet tube but is open on the inlet side. The perpendicular tube penetrates the filter and terminates in an open end within the filter. The filter is open on the bottom and is rigidly suspended by guides within the clear plastic housing. An optional relief valve or drain on the bottom of the housing opposite the inlet/outlet tube opens within the filter. The housing can be separated from the inlet/outlet tube-containing top for easy cleaning and has a rubber seal.

In use, the debris trap is spliced into the pool cleaner flexible hose. The "T" shape causes the entire housing, including the rubber seal, to be suspended below the water line and allows the housing to be removed without disconnecting the debris trap from the flexible hose, thereby substantially reducing the likelihood that air can enter the system. Water and debris entering the inlet are directed downward into the interior of the filter by the perpendicular tube. The water then filters outward through the filter and migrates to the outlet along the open space between the filter and the housing, trapping the debris within the filter where the heavier debris settles to the bottom of the housing rather than collecting on the filter. The relief valve on the bottom of the housing, if present, allows water to be drawn into the housing to balance the fluid flow to or from the cleaner head. Additionally, the design of the present invention prevents dirt and debris from accumulating at the seal line, with these materials settling away from the seal under force of gravity.

DETAILED DESCRIPTION

Figure 1:
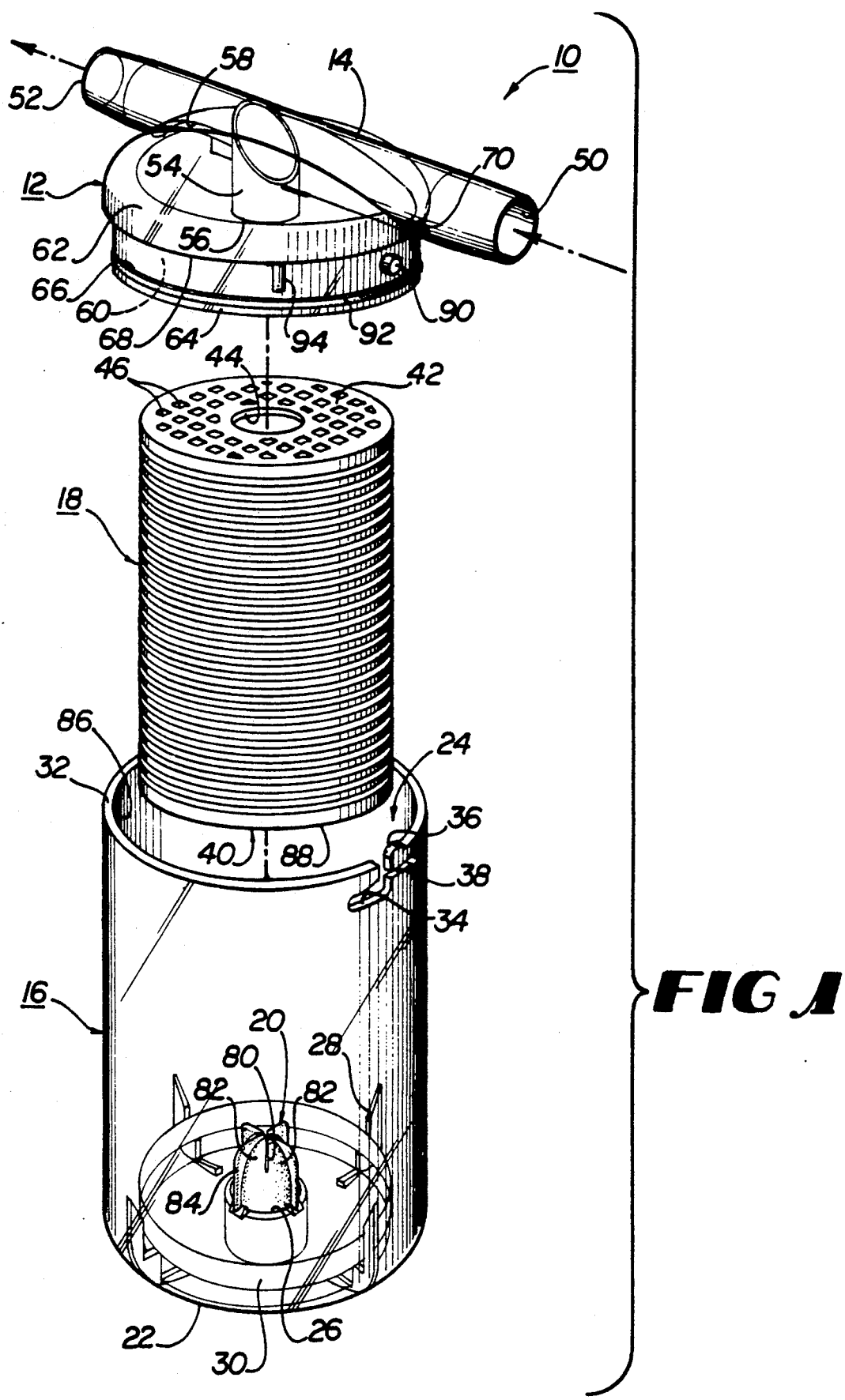
FIG. 1 is an exploded perspective view of the debris trap of the present invention.
Figure 2:
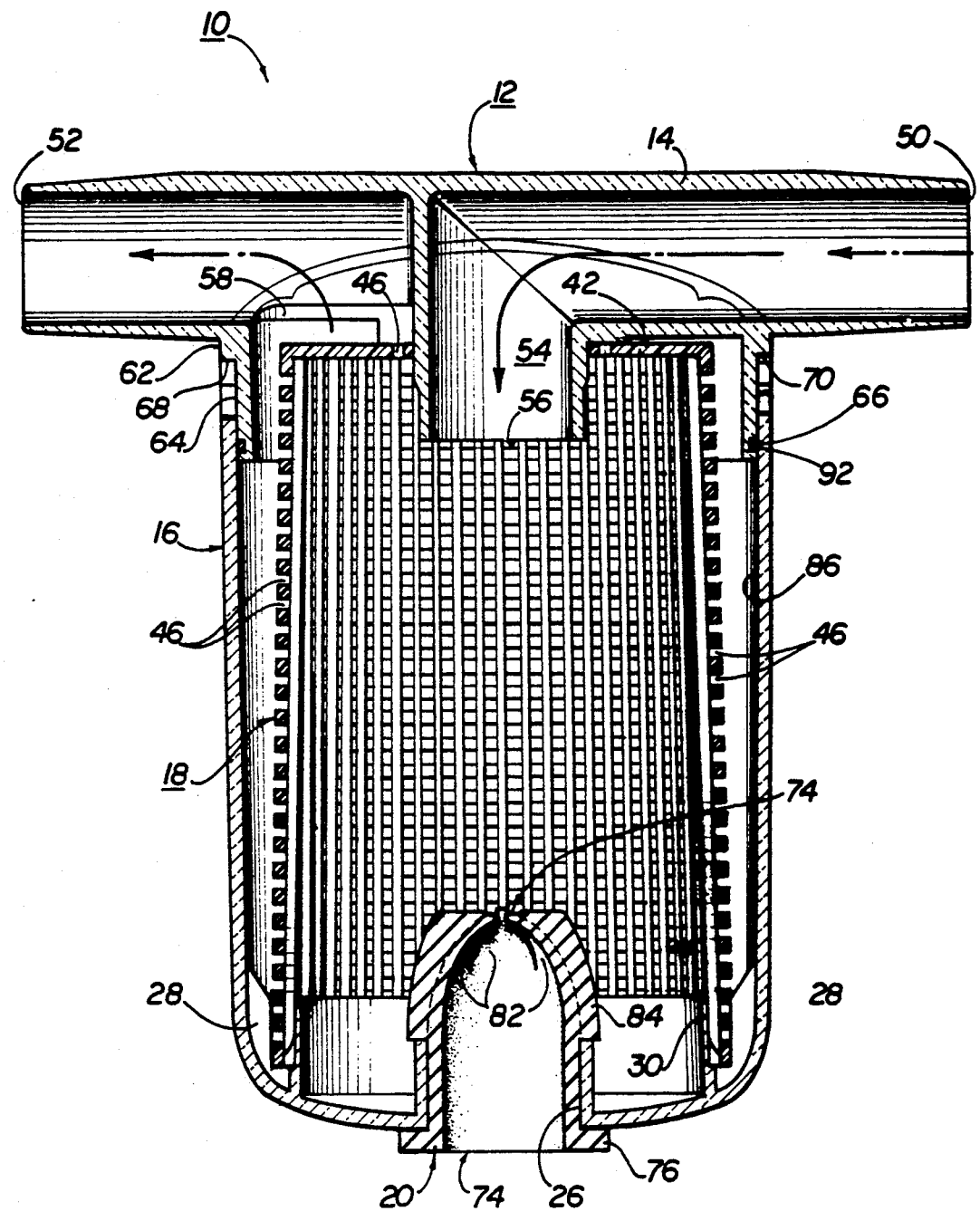
FIG. 2 is an elevational cross-section of the debris trap of the present invention taken longitudinally through the lid and the housing.

As can be seen in FIG. 1, debris trap 10 includes a lid 12 containing conduit 14, housing 16, filter 18 and valve 20. Lid 12 and housing 16 are preferably made of transparent plastic and filter 18 is preferably made of plastic, but other rust and chemical resistant materials, both transparent and opaque, may also be used.

Housing 16 is generally cylindrical and hollow with a closed end 22 and an open end 24 opposite closed end 22. Closed end 22 contains aperture 26, spaced guides 28 and annular ring 30. Rim 32 on open end 24 contains generally "L" shaped slots 34, locking tabs 36 and key shaped locking tab slots 38.

Filter 18 is generally cylindrical, hollow, slightly smaller in diameter and length than housing 16, has an open end 40 and a closed end 42 and contains perforations 46. Closed end 42 contains intake hole 44. Perforations 46 can range in size and shape depending upon the degree of filtration desired but generally are on the order of one-thirtysecond to one-quarter of an inch across. As those skilled in the art will recognize, a paper cartridge or other similar structure may be used as filter 18.

Lid 12 is generally dome shaped, has an interior 60 and an exterior 62, an annular rim 64 containing groove 66 and locking pins 90, a shoulder 68 having notches 70 and is bisected on exterior 62 across the top of the dome by a conduit 14 having an inlet 50 and an outlet 52. Conduit 14 is intersected at midpoint by downspout 54 that is normal to conduit 14, projects downward through the center of lid 12 and terminates at open end 56 within interior 60. Downspout 54 prevents direct flow through conduit 14 from inlet 50 to outlet 52. Instead, downspout 54 opens into conduit 14 on inlet 50 side only, thereby redirecting any flow into inlet 50 into downspout 54 and out open end 56. Conduit 14 also contains exit port 58 that penetrates conduit 14 and opens to interior 60 on outlet 52 side of downspout 54.

Valve 20 is generally tubular, open on one end 72, rounded and closed on opposite end 74 and preferably made from a resilient material. Open end 72 contains a peripheral flange 76 projecting radially around the exterior 78 of valve 20. Closed end 74 contains perpendicular slits 80 that form identical flaps 82 in end 74. Stiffening ribs 84 extend down flaps 82 between slits 80.

To assemble debris trap 10, closed end 74 of valve 20 is telescopically inserted into aperture 26 in housing 16 and is frictionally retained within aperture 26 so that closed end 74 projects into the interior 86 of housing 16 and flange 76 seals around aperture 26. Open end 40 of filter 18 is inserted into open end 24 of housing 16 so that rim 88 on open end 40 rests on guides 28 and surrounds rim 30. Guides 28 suspend filter 18 within housing 16 and rim 30 prevents water and debris from bypassing filter 18 by flowing around rim 88. Lid 12 is placed on housing 16 so that downspout 54 journals through hole 44 in closed end 42 of filter 18 and rim 64 on lid 12 telescopes into open end 24 of housing 18 so that locking pins 90 are received in locking pin slots 34 and rim 32 on housing 16 contacts shoulder 68 on lid 12. Because locking pin slots 34 are slanted away from rim 32, rotating lid 12 causes pins 90 to move deeper within pin slots 34 and push downward on locking tabs 36, thereby compressing locking tab slots 38. Pins 90 and notches 70 are spaced so that as pins 90 reach the bottom of pin slots 34, notches 70 align with locking tabs 36 and locking tabs 36 snap upward into notches 70, preventing further rotation of lid 12. Resilient seal 92 held within groove 66 on rim 64 seals rim 64 within housing 16 and friction ribs 94 on rim 64 prevent side-to-side movement of rim 64 within housing 16.

In use, a flexible hose is connected between the swimming pool skimmer inlet and outlet 52. Another flexible hose is connected between inlet 50 and the pool cleaner. When the swimming pool filter pump is activated, water is drawn through the pool cleaner and into inlet 50 in conduit 14. Downspout 54 prevents the water from directly flowing through conduit 14 and exiting outlet 52 and instead directs the water downward through hole 44 and into filter 18 housed within housing 16. The water travels outward through perforations 46 in filter 18 so that debris larger than perforations 46 remain within filter 18. The water migrates along housing 16 and enters outlet 52 side of conduit 14 through exit port 58. The water is ultimately drawn through the swimming pool filters and returned to the swimming pool. If the pool cleaner or system regulator valve should become plugged or blocked, the reduced pressure within debris trap 10 will cause the water pressure outside of debris trap 10 to force apart flaps 82 in valve 20 and allow additional water to enter debris trap 10, thereby equalizing the pressure within the filtration system. The pressure at which flaps 82 will open can be controlled by varying the resilient material from which valve 20 is made and by adjustments to the size of stiffening ribs 84.

Figure 3:
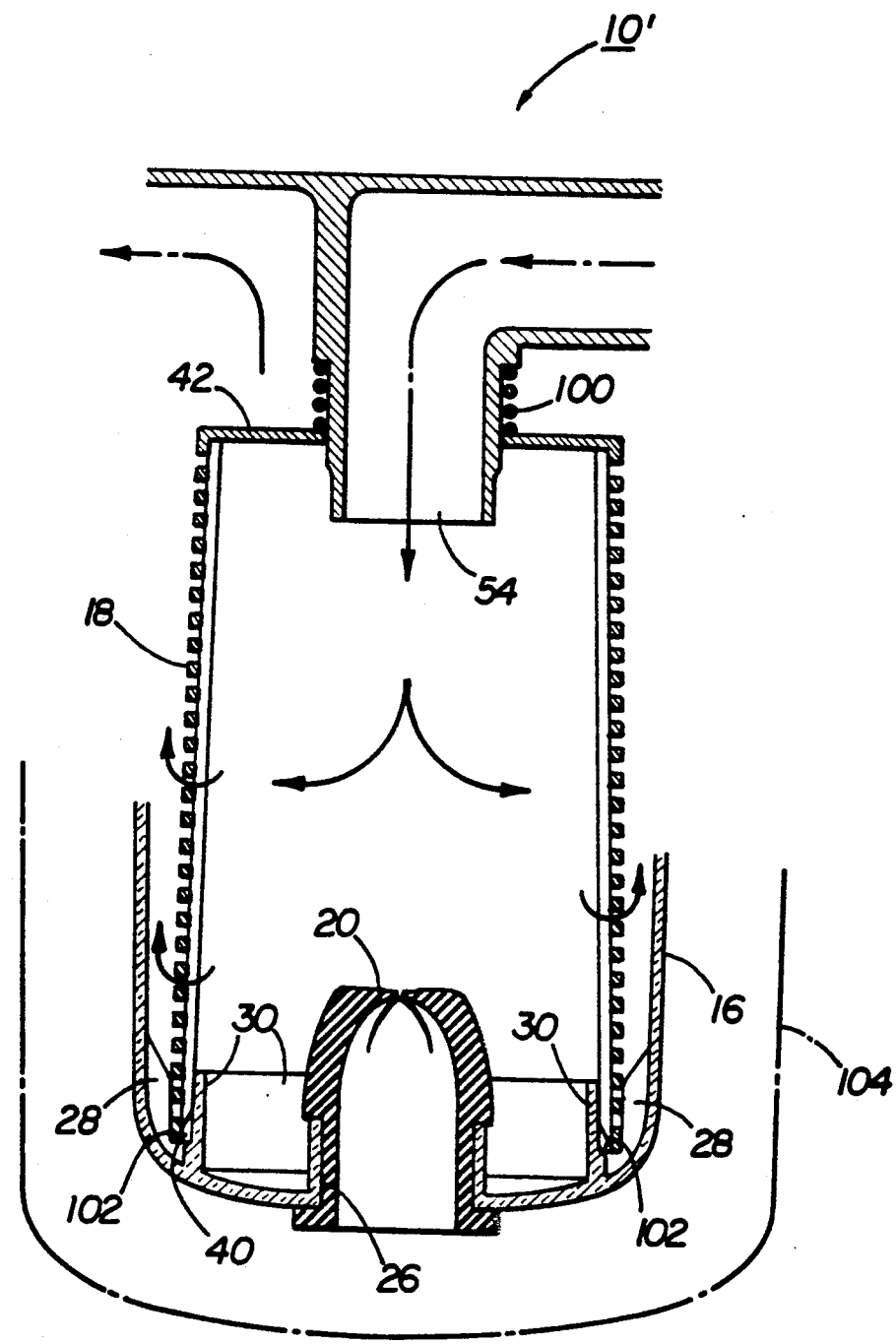
FIG. 3 is a partially-schematized, elevational cross-section of an alternate debris trap of the present invention.

FIG. 3 illustrates an alternate debris trap 10' of the present invention. As shown in FIG. 3, trap 10' includes spring 100 positioned about downspout 54 (or integrally or otherwise formed therewith), for biasing filter 18 into slotted areas 102 between guides 28 and annular ring 30. Should filter 18 become clogged and fluid build about the base or open end 40, however, the resiliency of spring 100 permits filter 18 to ascend, thereby allowing fluid flow from within filter 18 to without via slotted areas 102. A variety of means, such as (but not limited to) a flexible lid 12, can be used to accomplish the same result as spring 100 and will be apparent to those skilled in the art.

This description is given for purposes of illustration and explanation. It will be apparent to those skilled in the relevant art that modifications and changes may be made to the invention as described above without departing from its scope and spirit. One such modification, for example, would include adding a flotation means inside the lid 12 to compensate for any negative buoyancy caused by the weight of the debris collected by trap 10. Another includes clipping or otherwise attaching a bucket 104 (with rim flotation means) of greater diameter than housing 16 to the outside of the housing 16. The top of the bucket 104 would reside immediately below the water level, forming an annulus which draws surface water into the bucket and making the entire trap 10 function as a floating skimmer or weir. The volume of debris-laden fluid skimmed in this manner would be determined principally by the diameter of the annulus and the resilience of valve 20 (or similar device) through which fluid may be drawn into filter 18 of trap 10.

What is claimed is:
1. A debris trap comprising:
   a. a housing comprising:
      i. a rim;
      ii. a plurality of slots terminating at the rim; and
      iii. at least one cylindrical guide;
   b. a lid detachably connected to the housing and comprising:
      i. a plurality of pins for engaging the slots; and
      ii. a conduit with an inlet and an outlet, which inlet and outlet are detachably connected to swimming pool cleaning equipment;
   c. a cylindrical filter rigidly suspended within the housing by the guide but detachable from the housing;
   d. a downspout normal to and intersecting the conduit that penetrates the lid and the filter, is in fluid communication with the inlet, and prevents direct flow between the inlet and the outlet;

e. a one-way relief valve positioned within the cylindrical guide in the housing that opens within the filter;

f. an exit port in the outlet that opens within the housing; and g. a bucket surrounding the housing, which bucket includes an open end for positioning proximate the lid and a closed end for positioning proximate the relief valve.

* * * * *